United States Patent
Yoshida

(10) Patent No.: US 12,421,113 B2
(45) Date of Patent: Sep. 23, 2025

(54) HEXAGONAL BORON NITRIDE FIBERS AND METHOD OF MANUFACTURING SAME

(71) Applicant: NICHIA CORPORATION, Anan (JP)

(72) Inventor: Hideki Yoshida, Tokushima (JP)

(73) Assignee: NICHIA CORPORATION, Anan (JP)

( * ) Notice: Subject to any disclaimer, the term of this patent is extended or adjusted under 35 U.S.C. 154(b) by 1583 days.

(21) Appl. No.: 16/829,635

(22) Filed: Mar. 25, 2020

(65) Prior Publication Data

US 2020/0307998 A1  Oct. 1, 2020

(30) Foreign Application Priority Data

Mar. 28, 2019 (JP) ................ 2019-064678

(51) Int. Cl.
  *C01B 21/064* (2006.01)

(52) U.S. Cl.
  CPC ........ *C01B 21/064* (2013.01); *C01P 2002/02* (2013.01); *C01P 2002/74* (2013.01); *C01P 2004/03* (2013.01); *C01P 2004/20* (2013.01); *C01P 2004/30* (2013.01); *C01P 2004/50* (2013.01)

(58) Field of Classification Search
  None
  See application file for complete search history.

(56) References Cited

U.S. PATENT DOCUMENTS

| | | | |
|---|---|---|---|
| 2012/0114905 A1* | 5/2012 | Engler | C04B 35/583 428/323 |
| 2016/0340191 A1* | 11/2016 | Ikemiya | H05K 1/0373 |
| 2018/0201818 A1* | 7/2018 | Otsuka | C01B 21/0645 |
| 2018/0354792 A1 | 12/2018 | Otsuka et al. | |
| 2019/0337803 A1* | 11/2019 | Otsuka | C01B 32/991 |

FOREIGN PATENT DOCUMENTS

| | | |
|---|---|---|
| CN | 102936138 A | 2/2013 |
| CN | 103193485 A | 7/2013 |
| JP | S61-072604 A | 4/1986 |
| JP | H10-053405 A | 2/1998 |
| JP | 2004182571 A | 7/2004 |
| JP | 2004244265 A | 9/2004 |
| JP | 2004255252 A | 9/2004 |

(Continued)

OTHER PUBLICATIONS

Chou et al.; Facile Synthesis of Hexagonal Boron Nitride Fibers with Uniform Morphology; Ceramics International; 39, 6427-6431; 2013.*

*Primary Examiner* — Guinever S Gregorio
(74) *Attorney, Agent, or Firm* — Hunton Andrews Kurth LLP

(57) ABSTRACT

A method of manufacturing hexagonal boron nitride fibers includes: providing amorphous fibrous boron nitride; performing heat treatment on the amorphous fibrous boron nitride at a first temperature of 500° C. or greater and less than 900° C. in an oxygen-containing atmosphere to obtain a first heat-treated product; and performing heat treatment on the first heat-treated product at a second temperature in a range of 1000° C. to 1800° C. in a nitrogen-containing atmosphere to obtain a second heat-treated product containing hexagonal boron nitride.

9 Claims, 6 Drawing Sheets

(56) References Cited

FOREIGN PATENT DOCUMENTS

| | | | |
|---|---|---|---|
| JP | 2008174448 | A | 7/2008 |
| JP | 2009167359 | A | 7/2009 |
| JP | 2010037123 | A | 2/2010 |
| JP | 2015023102 | A | 2/2015 |
| JP | 2017095293 | A | 6/2017 |
| JP | 2018052754 | A | 4/2018 |

* cited by examiner

HEXAGONAL BORON NITRIDE FIBERS AND METHOD OF MANUFACTURING SAME

CROSS-REFERENCE TO RELATED APPLICATION

This application claims priority to Japanese Patent Application No. 2019-064678, filed on Mar. 28, 2019, the contents of which are hereby incorporated by reference in its entirety.

BACKGROUND

1. Technical Field

The present disclosure relates to hexagonal boron nitride fibers and a method of manufacturing the same.

2. Description of Related Art

Hexagonal boron nitride is known as a compound exhibiting good physical properties such as high thermal conductivity, high electrical insulation, high chemical stability and the like. There has been provided a method of manufacturing hexagonal boron nitride including: heating a melamine-based compound with boric acid or boron oxide in an appropriate solvent to react; cooling the same to grow crystals; and thereafter heating the crystals in a non-oxidizing atmosphere to obtain hexagonal boron nitride polycrystals of microcrystals or fibrous hexagonal boron nitride polycrystals (for example, see Japanese Patent Application Publication JP H10-53405 A).

Boron nitride was obtained using a method of manufacturing as described in Japanese Patent Application Publication JP H10-53405 A, and crystallinity of the obtained boron nitride was confirmed by X-ray diffraction measurement. As a result of the measurement, it was found that the obtained spectrum had a low intensity of the X-ray diffraction peak corresponding to the (0002) plane of the obtained hexagonal boron nitride and thus the obtained spectrum was broad. This result revealed that the boron nitride obtained using a method of manufacturing as described in Japanese Patent Application Publication JP H10-53405 A had low crystallinity. It is assumed that such an X-ray diffraction spectrum results from existence of a large amount of amorphous portions in the boron nitride. In order to improve the function of the hexagonal boron nitride, improvement in crystallinity is required. Accordingly, one object of embodiments of the present disclosure is to provide hexagonal boron nitride fibers with improved crystallinity of hexagonal boron nitride as compared to fibrous boron nitride obtained by a conventional manufacturing method, and a method of manufacturing the same.

SUMMARY

According to a first aspect of the present disclosure, a method of manufacturing hexagonal boron nitride fibers includes: providing amorphous fibrous boron nitride; performing heat treatment on the amorphous fibrous boron nitride at a first temperature of 500° C. or greater and less than 900° C. in an oxygen-containing atmosphere to obtain a first heat-treated product; and performing heat treatment on the first heat-treated product at a second temperature in a range of 1000° C. to 1800° C. in a nitrogen-containing atmosphere to obtain a second heat-treated product containing hexagonal boron nitride.

According to a second aspect of the present disclosure, hexagonal boron nitride fibers include hexagonal boron nitride, wherein an X-ray diffraction spectrum of the hexagonal boron nitride fibers includes a diffraction peak having a half-width of 2.0° or less in a region where 2θ is in a range of 20° to 30°.

Certain embodiments of the present disclosure may allow for obtaining hexagonal boron nitride fibers with improved crystallinity as hexagonal boron nitride as compared to fibrous boron nitride obtained through a conventional manufacturing method, and a method of manufacturing the same.

DETAILED DESCRIPTION

Figure 1A:
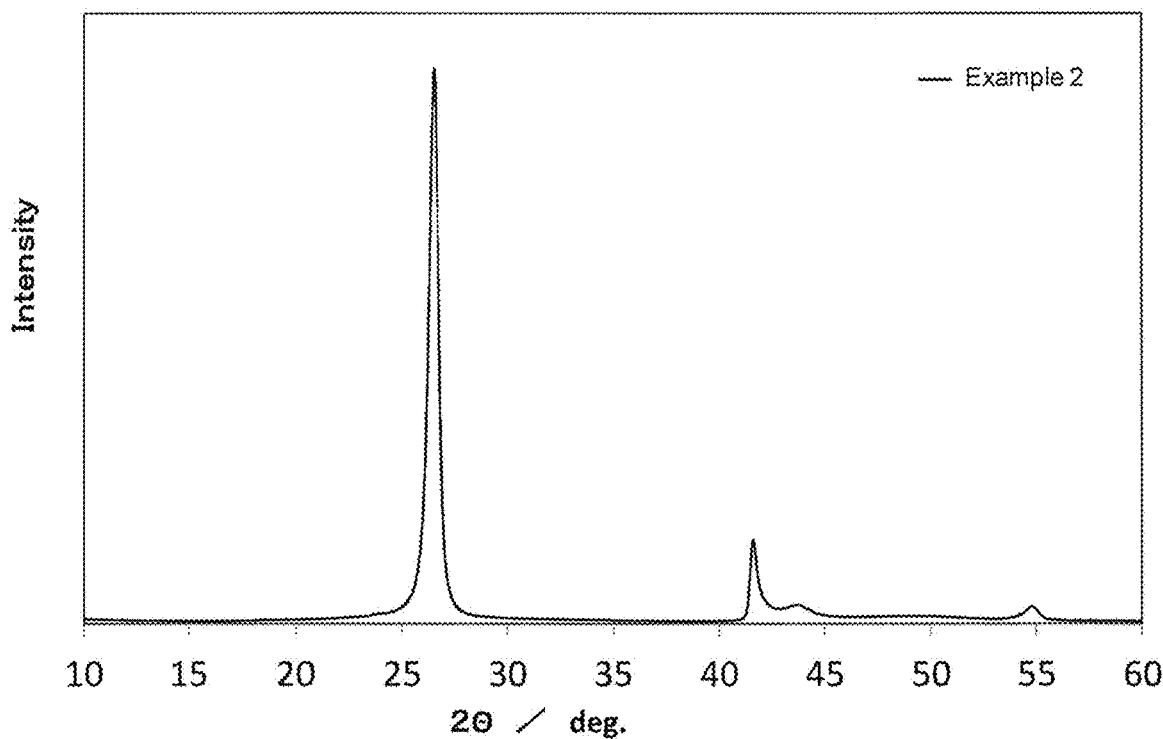
FIG. 1A is an X-ray diffraction spectrum of the hexagonal boron nitride fibers of Example 2.

In the present specification, the term "step" is used not only in a case in which the step is a discrete step, but also in a case in which the step is not clearly distinguished from other steps, so long as an intended object of the step is attained. Unless otherwise specified, when there exists a plurality of substances corresponding to a component in a composite, the content of the component in the composite refers to the total amount of that plurality of substances in the composite. Certain embodiments of the present disclosure will be described below in detail. However, embodiments described below illustrates examples of hexagonal boron nitride fibers and examples of a method of manufacturing the same for giving a concrete form to the technical idea of the present disclosure, and the scope of the present disclosure is not limited to the hexagonal boron nitride fibers and the method of manufacturing the same as described below. The members described in claims are not limited to the members described in the embodiments described above.

Method of Manufacturing Hexagonal Boron Nitride Fibers

A method of manufacturing hexagonal boron nitride fibers may include: a providing step of providing amorphous fibrous boron nitride; a first heat-treatment step of heat-treating the fibrous boron nitride at a first temperature of 500° C. or greater and less than 900° C. in an oxygen-containing atmosphere to obtain a first heat-treated product; and a second heat-treatment step of heat-treating the first heat-treated product at a second temperature in a range of 1000° C. to 1800° C. in a nitrogen-containing atmosphere to obtain a second heat-treated product containing hexagonal boron nitride. As necessary, the method may further include other steps such as a refining step, a dehydrating step and the like.

Providing Step

In a providing step, amorphous fibrous boron nitride is provided. The average aspect ratio of the fibrous boron nitride may be, for example, 1.5 or greater and 150 or less. The average aspect ratio of the fibrous boron nitride may be calculated using the average fiber length and the average thickness of the fibrous boron nitride that are estimated from an SEM image. The average fiber length of the fibrous boron nitride may be, for example, 5 μm or greater and 100 μm or less. The average thickness of the fibrous boron nitride may be, for example, 0.5 μm or greater to 5 μm or less. The expression "amorphous fibrous boron nitride" refers to that, for example, in the X-ray diffraction spectrum, a half-width of the maximum peak in a region where the diffracted angle $2\theta$ is in a range of 20° to 30° is, for example, 2.0° or more, or 2.3° or more. Amorphous fibrous boron nitride may be selected from any appropriate commercially available products to provide amorphous fibrous boron nitride, or may be manufactured through any appropriate known method of manufacturing to provide amorphous fibrous boron nitride.

Amorphous fibrous boron nitride is obtained by, for example, performing heat treatment on a fibrous substance, which is a precursor configured as a melamine-based compound and a boron compound, in a non-oxidizing atmosphere. A method of manufacturing amorphous fibrous boron nitride can be referred to, for example, JP H10-53405 A.

Examples of the melamine-based compound include a melamine condensate and the like such as melamine, ammeline, ammelide, melam, and melon. At least one melamine-based compound may be used. Examples of the boron compound include boric acid, boron oxide, and the like, and the boron compound can be at least one selected from the group consisting of these materials. Examples of boric acid include orthoboric acid, metaboric acid, tetraboric acid and the like. Examples of boron oxide include diboron trioxide, diboron dioxide, tetraboron trioxide, tetraboron pentoxide and the like.

The fibrous substance derived from a melamine-based compound with a boron compound is, for example, a crystal obtained by heating a melamine-based compound and a boron compound in a solvent to dissolve the melamine-based compound and the boron compound, resulting in obtaining a solution, and allowing the solution to be cooled to precipitate the crystal. For the solvent, for example, water, an acid aqueous solution, an ammonium aqueous solution, or the like can be used. The heating temperature may be, for example, 80° C. or more, preferably 95° C. or more. The upper limit value of the heating temperature may be the boiling point of the obtained solution. The obtained fibrous substance may be, for example, a molecular crystal in which the mole ratio of the boric acid to the melamine-based compound is 2.

The fibrous substance precipitated from the solvent may be separated from the solvent by filtering, and thereafter may undergo a drying such as heat drying, decompression drying or the like, when necessary. The fibrous precursor of boron nitride is then heat-treated in a non-oxidizing atmosphere to obtain amorphous fibrous boron nitride, which is a heat-treated precursor. The non-oxidizing atmosphere may have an oxygen concentration of, for example, 1000 ppm or less, or 100 ppm or less, and may be an inert gas atmosphere such as rare gas or nitrogen gas, or an ammonium atmosphere. The heat treatment may be performed at a temperature of, for example, 1300° C. or greater and 1800° C. or less, or at a temperature of 1300° C. or greater and 1500° C. or less. The heat-treatment may be in a range of, for example, 15 minutes to 24 hours, 1 hour to 8 hours, or 2 hours to 6 hours.

The providing step may further include bringing the heat-treated precursor into contact with a liquid medium. By bringing the heat-treated precursor into contact with a liquid medium, for example, at least a portion of impurities contained in the heat-treated product is removed, which is considered to allow for manufacturing hexagonal boron nitride fibers of higher crystallinity. The liquid medium may contain, for example, at least water, and may further include an acidic component (for example, a volatile acidic compound), a volatile alkaline component such as ammonia. For example, the heat-treated precursor may be immersed in the liquid medium to bring the heat-treated precursor into contact with the liquid medium. When necessary, stirring may be performed, or the liquid medium may be circulated.

The amount of the liquid medium used in the bringing into contact may be, for example, 10 times or more, preferably 50 times or more, as great as the mass of the heat-treated precursor. The amount of the liquid medium is equal to or less than 200 times or less, preferably equal to or less than 100 times, as great as the mass of the heat-treated precursor. The temperature of the liquid medium in the contact may be in a range of, for example, 5° C. to 100° C., or 25° C. to 95° C. The contact time may be in a range of 1 hour to 48 hours, or 15 hours to 36 hours. The heat-treated precursor brought into contact with the liquid medium may at least partially be removed from the liquid medium by filtering. As necessary, the heat-treated precursor thereafter may undergo a drying step such as heat drying, decompression drying.

First Heat-Treatment Step

In a first heat-treatment step, heat treatment is performed on the provided amorphous fibrous boron nitride at a temperature equal to or higher than the melting point of boron oxide and equal to or lower than the melting point of boron nitride in an oxygen-containing atmosphere, to obtain a first heat-treated product. The heat treatment is performed on the provided amorphous fibrous boron nitride at a first temperature of at least 500° C. or greater and less than 900° C. in an oxygen-containing atmosphere, to obtain the first heat-treated product. It is assumed that heat-treating the amorphous fibrous boron nitride at the first temperature in the oxygen-containing atmosphere causes boron oxide contained in the fibrous boron nitride to be melted and disposed on a surface of the fibrous boron nitride. The boron oxide is obtained through the first heat-treatment step, using impurities attributed to the providing step or the fibrous boron nitride as the boron source. As used herein, the expression "disposed" includes the case where the boron oxide is disposed to surround the entire periphery of a single string of amorphous fibrous boron nitride, and the case where the boron oxide surrounds a plurality of strings of amorphous fibrous boron nitride to form apparently a single string of fibrous boron nitride. Performing such first heat-treatment step allows for manufacturing hexagonal boron nitride fibers having high crystallinity in a second heat-treatment step which will be described below, compared to that of a conventional hexagonal boron nitride fibers. The first heat-treated product may be, for example, amorphous fibrous boron nitride, and may be amorphous fibrous boron nitride containing boron oxide.

In the oxygen-containing atmosphere in the first heat-treatment step, the oxygen gas concentration may be, for example, 5 volume percent or more, or 20 volume percent or more, and for example, 100 volume percent or less, or 50 volume percent or less. The oxygen-containing atmosphere may further contain, in addition to oxygen, nitrogen gas or rare gas such as argon, carbon dioxide gas and the like, and may be an air atmosphere.

The first temperature may be, for example, 500° C. or more, 550° C. or more, 600° C. or more, or 650° C. or more, 700° C. or more, and for example, 900° C. or less, 850° C. or less, or 800° C. or less. The first temperature is preferably 600° C. or greater and 800° C. or less, particularly preferably 700° C. or greater and 800° C. or less. This allows the boron oxide to be disposed on the surface of the fibrous boron nitride while reducing melting of the fibrous boron nitride.

The heat-treatment time in the first heat-treatment step may be, for example, 3 hours or more, 5 hours or more, or 10 hours or more, and for example, 36 hours or less, 24 hours or less, or 15 hours or less.

Second Heat-Treatment Step

In a second heat-treatment step, heat treatment is performed on the first heat-treated product at a second temperature of 1000° C. or greater and 1800° C. or less in a nitrogen-containing atmosphere, to obtain a second heat-treated product. By performing the heat treatment on the first heat-treated product at the second temperature higher than the first temperature in the nitrogen-containing atmosphere, hexagonal boron nitride fibers which are higher in crystallinity than conventional fibers are obtained. This is thought to be due to that amorphous boron nitride and boron oxide that is contained in the first heat-treated product is changed to hexagonal boron nitride. The second heat-treated product contains, for example, hexagonal boron nitride, and hexagonal boron nitride fibers having a fibrous structure comprising or as an aggregate of particles.

The nitrogen-containing atmosphere contain nitrogen, and may contain inert gas such as rare gas in addition to nitrogen, when necessary. The nitrogen-containing atmosphere is preferably non-oxidizing, and the oxygen concentration is, for example, 1 volume percent or less, or 0.01 volume percent or less. The nitrogen-containing atmosphere more preferably does not substantially contain oxygen. The expression "not substantially containing oxygen" refers to that the nitrogen-containing atmosphere may contain oxygen that is inevitably mixed. The nitrogen concentration in the nitrogen-containing atmosphere may be, for example, 30 volume percent or more, 60 volume percent or more, 90 volume percent or more, or 99.99 volume percent or more, and may be a substantial nitrogen atmosphere. The expression "a substantial nitrogen atmosphere" refers to that the atmosphere containing nitrogen may further contain a gas that is other than nitrogen and is inevitably mixed in the atmosphere.

In view of improving crystallinity, the second temperature may be, for example, 1000° C. or greater, 1200° C. or greater, 1400° C. or greater, 1500° C. or greater, or 1600° C. or greater, and for example, 1800° C. or less, 1750° C. or less, or 1700° C. or less. The second temperature is preferably 1400° C. or greater and 1700° C. or less. Using the second temperature in this preferable range may improve the crystallinity of the hexagonal boron nitride forming that fibrous structure while maintaining the fibrous structure of an aggregate of particles.

The heat-treatment time in the second heat-treatment step may be, for example, 3 hours or more, 5 hours or more, or 10 hours or more, and 36 hours or less, 24 hours or less, or 15 hours or less.

Hexagonal Boron Nitride Fibers

The hexagonal boron nitride fibers (hereinafter may be referred to also as "the boron nitride fibers") contain hexagonal boron nitride, and have a fibrous shape as a whole. The half-width of the diffraction peak detected in the range where the diffracted angle $2\theta$ is from 20° to 30° in the X-ray diffraction (XRD) spectrum may be 2.0° or less. The diffraction peak detected in a range where $2\theta$ is from 20° to 30° is the peak mainly attributed to the (0002) plane of hexagonal boron nitride. Exhibiting a diffraction peak with a narrow half-width indicates that boron nitride fibers are mainly formed of a hexagonal crystal structure. Accordingly, for example, when the hexagonal boron nitride fibers are added to a resin, a reflectance of the resin at the wavelength of 450 nm can be improved, and the resin can have good thermal conductivity is attained.

The half-width of the diffraction peak detected in the range where $2\theta$ is from 20° to 30° (hereinafter may also referred to as a "specific diffraction peak") may be, for example, 1.8° or less, 1.5° or less, 1.0° or less, less than 1.0°, 0.9° or less, or 0.8° or less. The lower limit value of the half-width is, for example, 0.1° or more, or 0.2° or more. In the X-ray diffraction spectrum measured using Cu K$\alpha$ radiation as the source of X-ray and under the condition of tube current 200 mA and tube voltage 45 kV, the half-width of the diffraction peak is measured as the full width at half maximum, where the half value is at an intensity of 50% of the maximum intensity of the specific diffraction peak.

In the specific diffraction peak, the ratio of the peak width at an intensity of 20% of the maximum peak intensity to the peak width at an intensity of 80% of the maximum peak intensity (hereinafter also referred to as "the XRD width ratio") may be, for example, 4.5 or less, 4 or less, 3.8 or less, or 3.5 or less. The XRD width ratio is, for example, 1.5 or more, or 2.0 or more. Having a narrow peak width at an intensity of 20% of the maximum peak intensity corresponds to the specific diffraction peak having a sharper shape and the boron nitride fibers are formed of boron nitride mainly having a hexagonal crystal structure.

In general, hexagonal boron nitride has a crystal structure similar to that of graphite, and may be formed of plate-like particles. Accordingly, as shown in SEM images of FIGS. 3A, 3B, and 3C, the boron nitride fibers may have a structure in which the plate-like hexagonal boron nitride particles are aggregated to form a fibrous structure as a whole. With the boron nitride fibers including plate-like hexagonal boron nitride particles, when a resin contains such boron nitride fibers, reflectance and thermal conductivity of the resin may be increased.

The average aspect ratio of the hexagonal boron nitride fibers may be, for example, 1.5 or more and 150 or less, or 1.5 or more and 100 or less. The average aspect ratio can be calculated using an average fiber length and an average minor diameter of the hexagonal boron nitride fibers that are estimated from an SEM image of the hexagonal boron nitride fibers. The average fiber length of the hexagonal boron nitride fibers may be, for example, 1 µm or greater and 100 µm or less, or 5 µm or greater and 60 µm or less. The average minor diameter of the boron nitride fibers may be, for example, 0.2 µm or greater and 20 µm or less, or 0.5 µm or greater and 10 µm or less. Furthermore, the average aspect ratio (obtained by dividing major diameter by thickness) of the plate-like hexagonal boron nitride particles forming the hexagonal boron nitride fibers may be, for example, greater than 1.0 and 200 or less, or may be 1.5 or greater and 67 or less. The average major diameter of the plate-like hexagonal boron nitride particles forming the hexagonal boron nitride fibers may be, for example, 0.1 µm or greater and 10 µm or less, or 0.5 µm or greater and 5 µm or less. The average thickness of the plate-like hexagonal boron nitride particles may be, for example, 0.05 µm or greater and 5 µm or less, or 0.075 µm or greater and 1 µm or less.

The average fiber length, the average minor diameter, and the average aspect ratio of the hexagonal boron nitride fibers are calculated as arithmetic mean values of the fiber length, the minor diameter, and the aspect ratio respectively, measured in an SEM image (for example, a magnification of 1,000 times) for 100 fibers. The average major diameter, the average thickness, and the average aspect ratio of the plate-like hexagonal boron nitride particles are calculated as arithmetic mean values of the major diameter, the thickness, and the aspect ratio, respectively, measured in an SEM image (for example, a magnification of 50,000 times) for 100 fibers.

Light Emitting Device

The light emitting device includes a light emitting element, and contains hexagonal boron nitride fibers. The light emitting device may include, for example: a package defining a recess; a light emitting element disposed on an upward-facing surface defining the recess; and a sealing member filled in the recess defined in the package to seal the light emitting element. The package includes lead electrodes and a resin composite containing hexagonal boron nitride fibers. With the package having a structure containing the hexagonal boron nitride fibers, volume per unit weight of the package is increased. This allows for improving light reflectance at the recess of the package. Accordingly, light emitted from the light emitting element can be efficiently extracted, so that luminous flux of the light emitting device can be increased. Furthermore, due to high thermal conductivity of hexagonal boron nitride, the thermal conductivity of the package can be improved. Thus, light emitting device having high durability is provided.

Figure 7:
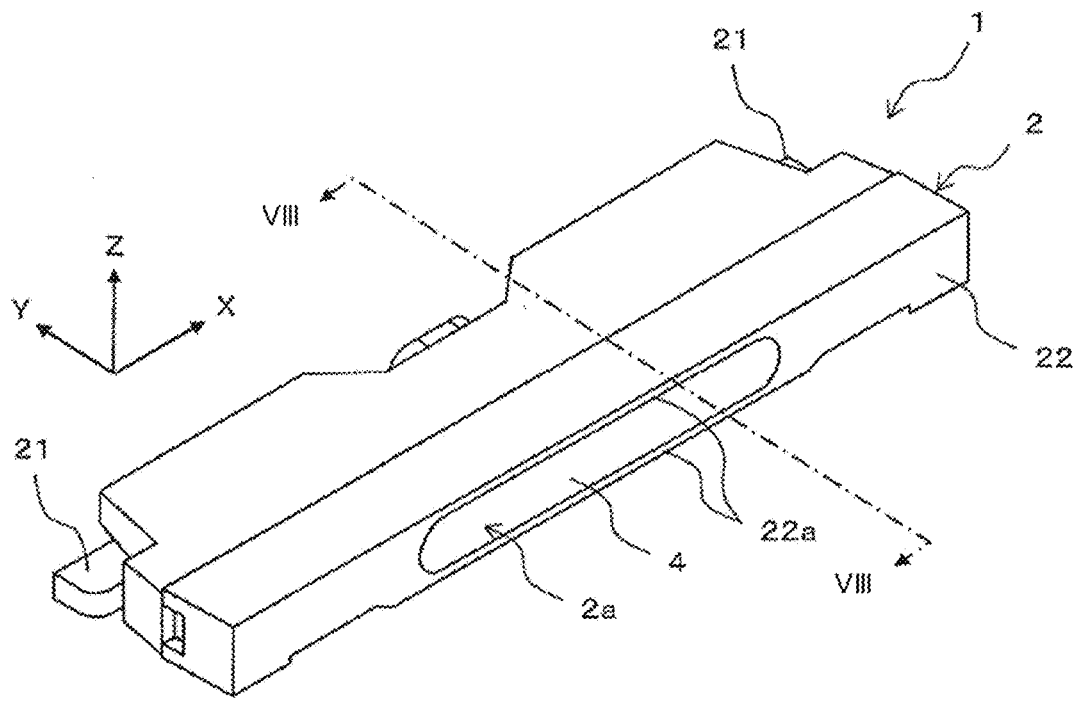
FIG. 7 is a schematic perspective view showing the configuration of a light emitting device according to an embodiment of the present disclosure.
Figure 8:
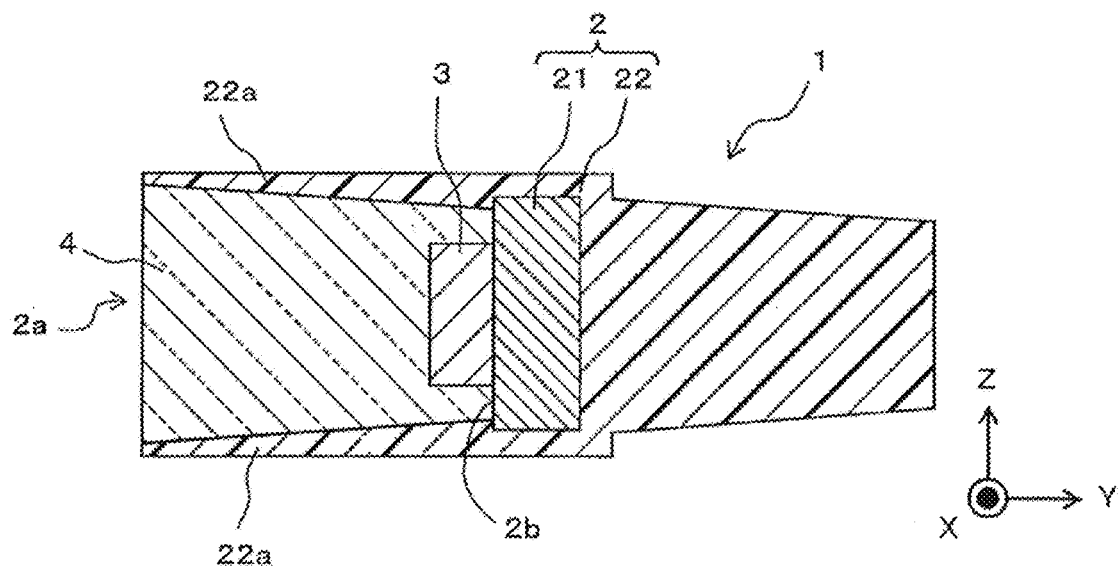
FIG. 8 is a schematic cross-sectional view taken along line VIII-VIII in FIG. 7.

With reference to FIGS. 7 and 8, configuration of the light emitting device will be described. FIG. 7 is a schematic perspective view showing the configuration of a light emitting device according to an embodiment of the present disclosure. FIG. 8 is a schematic cross-sectional view showing the configuration of the light emitting device according to the embodiment, corresponding to a cross section taken along line VIII-VIII in FIG. 7. For the sake of convenience, in FIGS. 7 and 8, the observation direction is indicated in XYZ coordinates. The long-side direction of the light emitting device 1 which has an elongated substantially rectangular prism shape is referred to as the X-axis direction, the short-side direction is referred to as the Y-axis direction, and the thickness direction is referred to as the Z-axis direction.

A light emitting device 1 includes: a package 2 defining a recess 2a; a light emitting element 3 disposed on an upward-facing surface 2b defining the recess 2a of the package 2; and a light-transmissive sealing member 4 disposed in the recess 2a to seal the light emitting element 3. The package 2 includes power-supply lead electrodes 21 and a resin molded body 22 holding the power-supply lead electrodes 21. The light emitting device 1 has an elongated substantially rectangular-prism outer shape having a small thickness, which is the dimension in the Z-axis direction. The light emitting device 1 has a mount surface in the −Z direction. The recess 2a is open toward the −Y direction. Accordingly, the light emitting device 1 is suitable for side-view mounting in which light is emitted in the direction parallel to the mount surface.

In the light emitting device 1, the resin molded body 22 of the package 2 is formed of a resin composite containing hexagonal boron nitride fibers and resin.

The package 2 includes the power-supply lead electrodes 21, and the resin molded body 22 which holds the power-supply lead electrodes 21 to be spaced apart from each other. The package 2 defines the recess 2a that opens laterally with respect to an end surface of the package 2 in the −Z-axis direction that is the mount surface. Accordingly, the upward-facing surface 2b of the recess 2a is substantially perpendicular to the mount surface. The recess 2a is defined by an upward-facing surface 2b, formed of the power-supply lead electrodes 21 and the resin molded body 22, and by lateral surfaces formed of lateral walls 22a of the resin molded body 22. The lateral walls 22a has a thickness smaller in the Z direction than in the X direction.

The light emitting element 3 is disposed in the recess 2a. The lateral walls 22a surrounds the light emitting element 3. The inner lateral surfaces forming the lateral walls 22a are inclined by a predetermined angle relative to the upward-facing surface 2b so as to spread from the bottom surface 2b side of the recess 2a toward the opening side. With this structure, light emitted from the light emitting element 3 toward the lateral walls 22a are reflected by the lateral walls 22a toward the opening, and are extracted to the outside of the package 2. The resin molded body 22 is formed of a resin composite containing hexagonal boron nitride fibers with high light reflectance, so that light emitted from the light emitting element 3 is reflected and efficiently extracted from the opening of the recess 2a.

In recent years, reduction in thickness of side-view packages has been advanced according to increase in demand for reduction in size of a light emitting device. Therefore, more specifically, the resin molded body 22 surrounding the light emitting element 3 is desired to partially have a thickness of, for example, 100 µm or less, further 50 µm or less. In the package 2, the opening of the recess 2a has an oval shape. Reduction in the thickness of the lateral walls 22a along the long-side direction of the opening of the recess 2a allows for reducing the outer dimension in the thickness direction of the package 2 without changing the dimension of the recess 2a. Accordingly, the light emitting device 1 with a reduced thickness can be provided.

Using the resin composite containing the hexagonal boron nitride fibers for the lateral walls 22a allows the lateral walls 22a to exhibit high light reflectivity. Further, having a shape of fibers allows for obtaining the necessary mechanical strength despite the reduced thickness. While the package 2 according to the present embodiment includes the recess 2a having an opening of an oval shape, the opening may have a circular shape an elliptic shape, a quadrangular shape, other polygon, etc.

In the light emitting element 3, a semiconductor layered body may be disposed on a substrate formed of sapphire or the like. For the semiconductor layered body, layers of an n-type semiconductor layer, a light emitting layer, and a p-type semiconductor layer may be used. For the light emitting layer, a semiconductor such as GaAlN, ZnS, ZnSe, SiC, GaP, GaAlAs, AlN, InN, AlInGaP, InGaN, GaN, or AlInGaN may be used. Among these, a nitride-based compound semiconductor element having a peak emission wavelength in the wavelength region of the ultraviolet region to the visible light short wavelength region (in a range of 360 nm to 700 nm) may be used.

The sealing member 4 may be disposed in the recess 2a of the package 2, and seals the light emitting element 3, the lead electrodes 21, wires each electrically connecting the light emitting element 3 and a corresponding one of the lead electrodes 21 disposed in the recess 2a. While the package 2 may not include the sealing member 4, the sealing member 4 can protect the sealed members from deterioration due to moisture or gas, or any damage due to a mechanical contact. While any appropriate material may be used for the sealing member, the material preferably has a high transmittance. Examples of such a material include a resin material such as silicone resin or epoxy resin, and an inorganic material such as glass.

The sealing member 4 may contain a fluorescent substance adapted to convert the wavelength of light emitted from the light emitting element 3, or a light reflective substance adapted to scatter light emitted from the light emitting element. The light reflective substance may be particles of titanium oxide ($TiO_2$), aluminum oxide ($Al_2O_3$) or the like. The fluorescent substance may be any appropriate substance adapted to absorb light emitted from the light emitting element and convert the wavelength of the light. Examples of the fluorescent substance include a yttrium-aluminum-garnet-based fluorescent material (e.g., $Y_3(Al,Ga)_5O_{12}$:Ce), a lutetium-aluminum-garnet-based fluorescent material (e.g., $Lu_3(Al,Ga)_5O_{12}$:Ce), a terbium-aluminum-garnet-based fluorescent material (e.g., $Tb_3(Al,Ga)_5O_{12}$:Ce), a silicate-based fluorescent material (e.g., $(Ba,Sr)_2SiO_4$:Eu), a chlorosilicate-based fluorescent material (e.g., $Ca_8Mg(SiO_4)_4Cl_2$:Eu), a β-sialon-based fluorescent material (e.g., $Si_{6-z}Al_zO_zN_{8-z}$:Eu(0<z<4.2)), an SGS-based fluorescent material (e.g., $SrGa_2S_4$:Eu), an alkaline earth aluminate-based fluorescent material (e.g., $(Ba,Sr,Ca)Mg_xAl_{10}O_{17-x}$:Eu,Mn), an α-sialon-based fluorescent material (e.g., $Mz(Si,Al)_{12}(O,N)_{16}$ (where 0<z≤2, M is Li, Mg, Ca, Y, and lanthanide elements excluding La and Ce), a nitrogen-containing calcium aluminosilicate-based fluorescent material (e.g., $(Sr,Ca)AlSiN_3$:Eu), a manganese-activated fluoride-based fluorescent material (a fluorescent material expressed by the general formula (1) $A_2[M_{1-a}Mn_aF_6]$ (where, in the general formula (1), A is at least one selected from the group consisting of K, Li, Na, Rb, Cs, and NH4, M is at least one element selected from the group consisting of Group 4 elements and Group 14 elements, and a satisfies 0<a<0.2)). The yttrium-aluminum-garnet-based fluorescent material can have the peak emission wavelength shifted to the long wavelength side by substituting Gd for a portion of Y. Examples of manganese-activated fluoride-based fluorescent material include a manganese-activated potassium silicofluoride-based fluorescent material (e.g., $K_2SiF_6$:Mn).

The hexagonal boron nitride fibers according to one embodiment may be used for the purpose other than the package material of the light emitting device. For example, the hexagonal boron nitride fibers may be used for a light reflective substance in the sealing resin.

EXAMPLES

In the description below, certain embodiments of the present disclosure will be more specifically described according to Examples. The scope of the present invention is not limited to Examples described below.

Example 1

Providing Step

In a providing step, pure water of 5000 ml was poured into a glass beaker. Then, melamine of 136.1 g and orthoboric acid of 133.6 g were added to the pure water, and were heated to 95° C. while stirring, until the color of the solution changed from whitish to transparent to entirely dissolve melamine and orthoboric acid. Thereafter, the solution was cooled to a room temperature to obtain a precipitate. The precipitate was filtered to obtain a fibrous substance of 237 g. The obtained fibrous substance was subjected to heat treatment for 5 hours at a temperature of 1400° C. in a nitrogen atmosphere. Thus, amorphous fibrous boron nitride of 44 g was obtained.

First Heat-Treatment Step

In the first heat-treatment step, the obtained fibrous boron nitride was subjected to heat treatment for 5 hours at a temperature of 700° C. in an air atmosphere, to obtain a first heat-treated product.

Second Heat-Treatment Step

In the second heat-treatment step, the obtained first heat-treated product was subjected to heat treatment for 5 hours at a temperature of 1700° C. in a nitrogen atmosphere (nitrogen concentration: 99.99 volume percent) to obtain hexagonal boron nitride fibers of Example 1 as a second heat-treated product.

The half-width of the diffraction peak of the obtained hexagonal boron nitride fibers of Example 1 was measured in a manner described later, which was 1.79°. The XRD width ratio was 4.18.

Example 2

Hexagonal boron nitride fibers of Example 2 were obtained similarly to the manner in Example 1 except for the description below. In the providing step, the precipitate of 40 g was immersed for 20 hours in pure water of 3000 ml. Then, after filtering, the precipitate was dried for 20 hours at a temperature of 80° C. in an air atmosphere, to obtain a fibrous substance. The fibrous substance was subjected to heat treatment for 5 hours at a temperature of 1400° C. in a nitrogen atmosphere, to obtain amorphous fibrous boron nitride.

The obtained hexagonal boron nitride fibers of Example 2 exhibited the diffraction peak having the half-width of 0.62° and the XRD width ratio of 3.39.

Example 3

Hexagonal boron nitride fibers of Example 3 were obtained similarly to the manner in Example 2 except that the heat-treatment temperature in the first heat-treatment step was changed to 800° C.

The obtained hexagonal boron nitride fibers of Example 3 exhibited the diffraction peak having the half-width of 0.86° and the XRD width ratio of 2.17.

Example 4

Hexagonal boron nitride fibers of Example 4 were obtained similarly to the manner in Example 2 except that the heat-treatment temperature in the first heat-treatment step was changed to 500° C.

The obtained hexagonal boron nitride fibers of Example 4 exhibited the diffraction peak having the half-width of 0.96° and the XRD width ratio of 3.56.

Example 5

Hexagonal boron nitride fibers of Example 5 were obtained similarly to the manner in Example 2 except that the heat-treatment temperature in the second heat-treatment step was changed to 1400° C.

The obtained hexagonal boron nitride fibers of Example 5 exhibited the diffraction peak having the half-width of 0.73° and the XRD width ratio of 3.61.

Comparative Example 1

The fibrous boron nitride obtained in the providing step of Example 1 was employed as boron nitride fibers C1 of Comparative Example 1.

The boron nitride fibers C1 exhibited the diffraction peak having the half-width of 6.34°.

Comparative Example 2

Boron nitride fibers C2 of Comparative Example 2 were obtained similarly to the manner in Example 1 except that the first heat-treatment step was omitted.

The boron nitride fibers C2 exhibited the diffraction peak having the half-width of 2.33° and the XRD width ratio of 4.70.

XRD Evaluation

Figure 2:
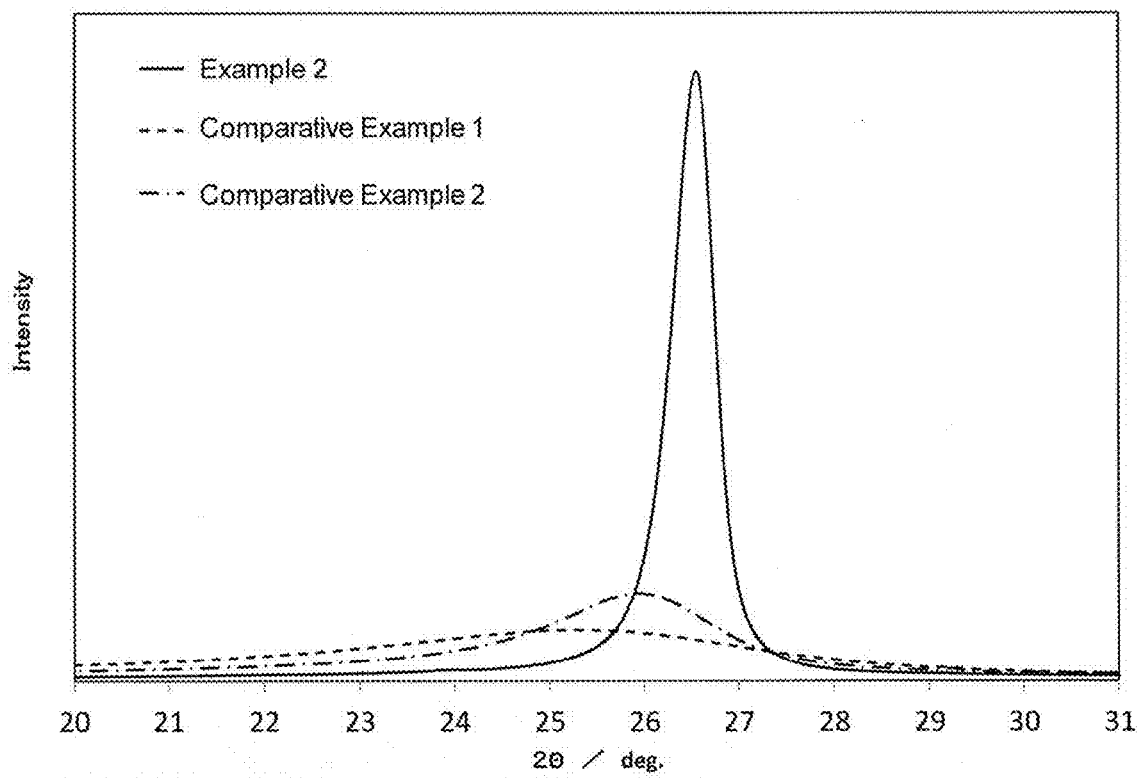
FIG. 2 shows X-ray diffraction spectra of the hexagonal boron nitride fibers of Example 2, the boron nitride fibers of Comparative Example 1 and the hexagonal boron nitride fibers of Comparative Example 2.

The boron nitride fibers obtained as described above were subjected to X-ray diffraction (XRD) measurement that was performed as described below. The measurement was performed using a powder X-ray diffractometer (product name: SmartLab) available from Rigaku Corporation, with CuKα radiation as the source of X-ray, under the condition of tube current 200 mA and tube voltage 45 kV. A value at an intensity that is a half of the maximum intensity of the obtained X-ray diffraction spectrum was determined as the half value, and the full width at half maximum (hereinafter referred to as the "half-width") was estimated. Furthermore, the peak width at the intensity of 20% of the maximum intensity of the diffraction peak of the obtained X-ray diffraction spectrum was divided by the peak width at the intensity of 80%, of the maximum intensity of the diffraction peak of the obtained X-ray diffraction spectrum, so that the XRD width ratio was obtained. The result is shown in Table 1. FIG. 1A shows the X-ray diffraction spectrum of the hexagonal boron nitride fibers of Example 2. FIG. 2 shows the X-ray diffraction spectrum of the hexagonal boron nitride fibers of Example 2, and that of the boron nitride fibers of Comparative Example 1 and Comparative Example 2.

Figure 1B:
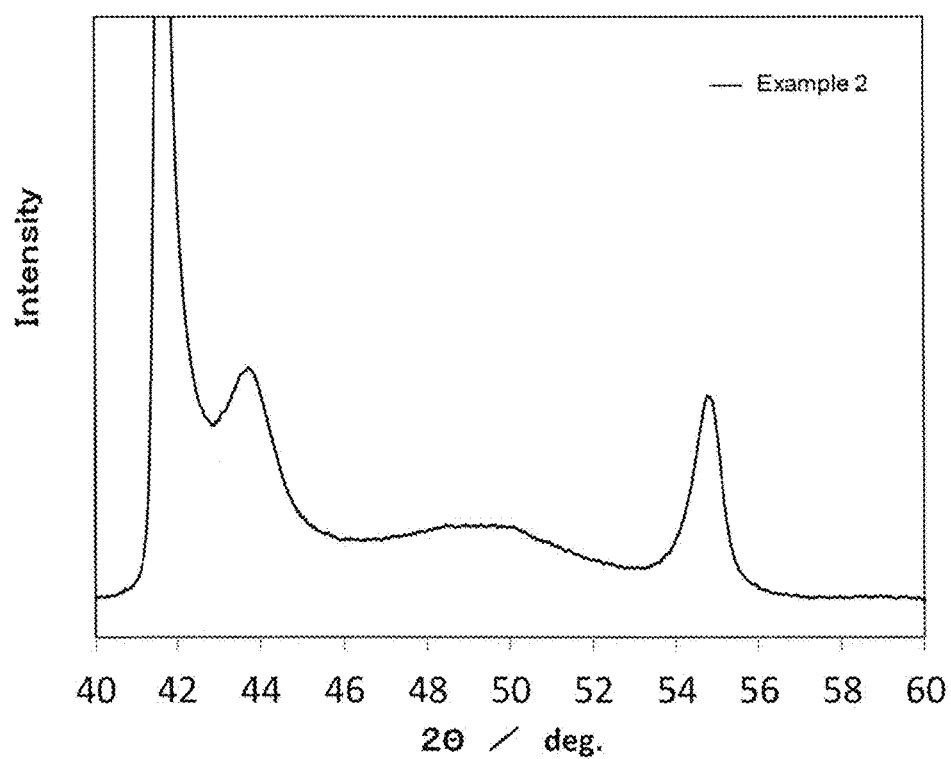
FIG. 1B is a partial enlarged graph of the X-ray diffraction spectrum of hexagonal boron nitride fibers of Example 2.

As shown in FIG. 1A, in the hexagonal boron nitride fibers of Example 2, the diffraction peak having the half-width of 0.62° considered to be attributed to the (0002) plane of hexagonal boron nitride was detected in the region where 2θ is around 26°. Further, as shown in FIG. 1B, the structure considered to be attributed to hexagonal boron nitride was detected in the region where 2θ is around 50°. As shown in FIG. 2, the boron nitride fibers of Comparative Example 1 and Comparative Example 2 exhibited broad diffraction peaks as compared to the hexagonal boron nitride fibers of Example 2.

As is apparent from the obtained half-widths of the specific diffraction peak, the boron nitride fibers of Examples 1 to 5 all had higher crystallinity than that in Comparative Examples 1 and 2. Further, as is apparent from the obtained XRD width ratio, the specific diffraction peaks of the hexagonal boron nitride fibers of Example 2 and Example 3 are sharper.

TABLE 1

|  | Half-width (°) | XRD width ratio |
|---|---|---|
| Example 1 | 1.79 | 4.18 |
| Example 2 | 0.62 | 3.39 |
| Example 3 | 0.86 | 2.17 |
| Example 4 | 0.96 | 3.56 |
| Example 5 | 0.73 | 3.61 |
| Comparative Example 1 | 6.34 | — |
| Comparative Example 2 | 2.33 | — |

SEM Evaluation

Figure 3A:
FIG. 3A is a scanning electron microscope (SEM) image of the hexagonal boron nitride fibers of Example 2.
Figure 3B:
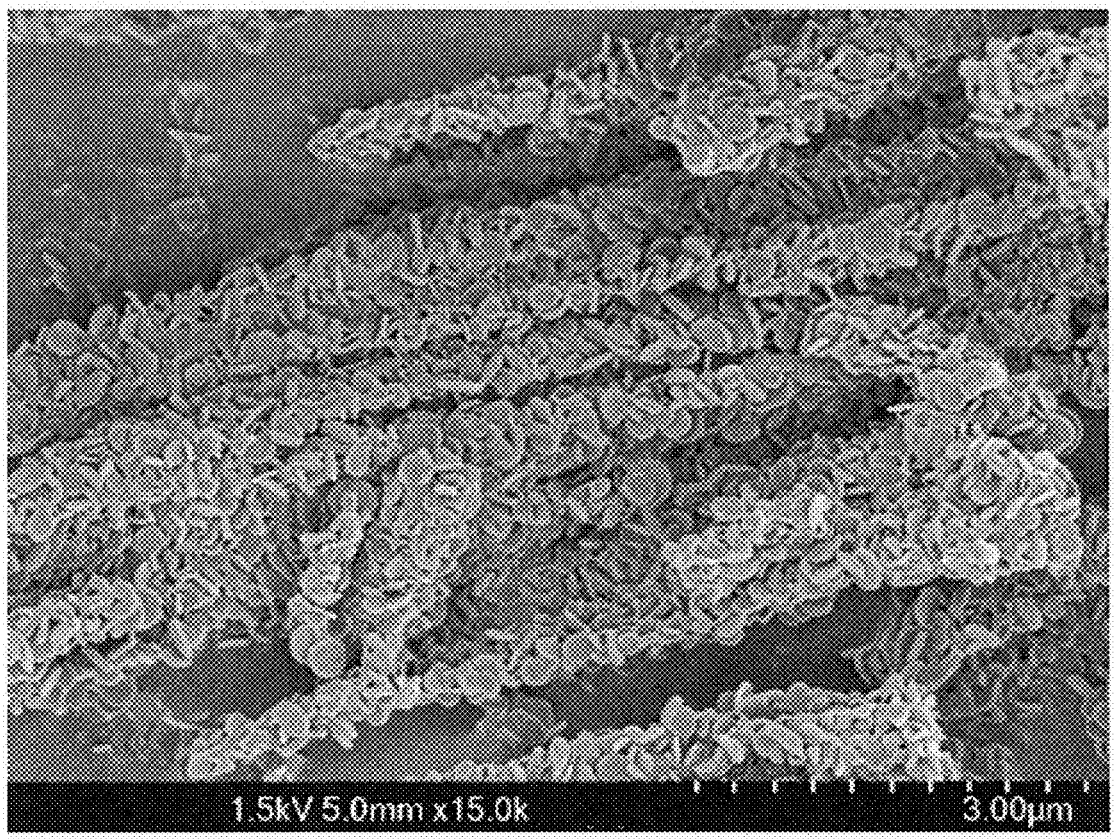
FIG. 3B is an enlarged SEM image of FIG. 3A.
Figure 3C:
FIG. 3C is an enlarged SEM image of FIG. 3B.

Scanning electron microscope (SEM) observation was performed on the hexagonal boron nitride fibers of Example 2. The observation was performed using a SEM-EDX device (model SU8230) available from Hitachi High-Technologies Corporation under the measurement condition of acceleration voltage 1.5 kV. FIG. 3A is an SEM image of a magnification of 1,000 times. FIG. 3B is an SEM image of a magnification of 15,000 times. FIG. 3C is a SEM image of a magnification of 50,000 times.

As shown in the obtained SEM images, it was confirmed that the hexagonal boron nitride fibers were formed by an aggregate of plate-like particles containing hexagonal boron nitride. The hexagonal boron nitride fibers, each of which was an aggregate of plate-like particles, had a fiber length in a range of 8 μm to 58 μm, and a length of the minor diameter in a range of 0.6 μm to 4 μm. The aspect ratio were in a range of 2 to 97. The plate-like particles forming the fibers had a major diameter of in a range of 1 μm to 3 μm, and a thickness in a range of 0.1 μm to 0.5 μm. The aspect ratio (obtained by dividing major diameter by thickness) of the plate-like particles was in a range of 2 to 30.

Reflectivity Evaluation

The hexagonal boron nitride fibers of Example 2, the amorphous fibrous boron nitride (Comparative Example 1), and commercially available hexagonal boron nitride of a particle size of 5 μm (available from Denka Company Limited, model HGP), were subjected to measurement of an absolute value of reflectance at a wavelength of 450 nm. In measurement, a handheld spectrophotometric color difference meter available from Nippon Denshoku Industries Co., Ltd. (model NF555) was used. As the standard member for the handheld spectrophotometric color difference meter, model S-00017 available from Nippon Denshoku Industries Co., Ltd. was used. The measurement of the reflectivity was performed on a mixture obtained by mixing a predetermined amount of boron nitride as filler with thermosetting epoxy resin and curing the same by heat treatment at 120° C. The result is shown in FIG. 4 and Table 2.

TABLE 2

|  | Added filler amount (vol %) | Reflectivity (%) |
|---|---|---|
| Example 2 | 5.0 | 90.35 |
|  | 9.5 | 95.50 |
|  | 13.6 | 97.05 |
| Comparative Example 1 | 5.0 | 80.05 |
| Commercially available product | 9.5 | 87.85 |
|  | 13.6 | 88.95 |

Figure 4:
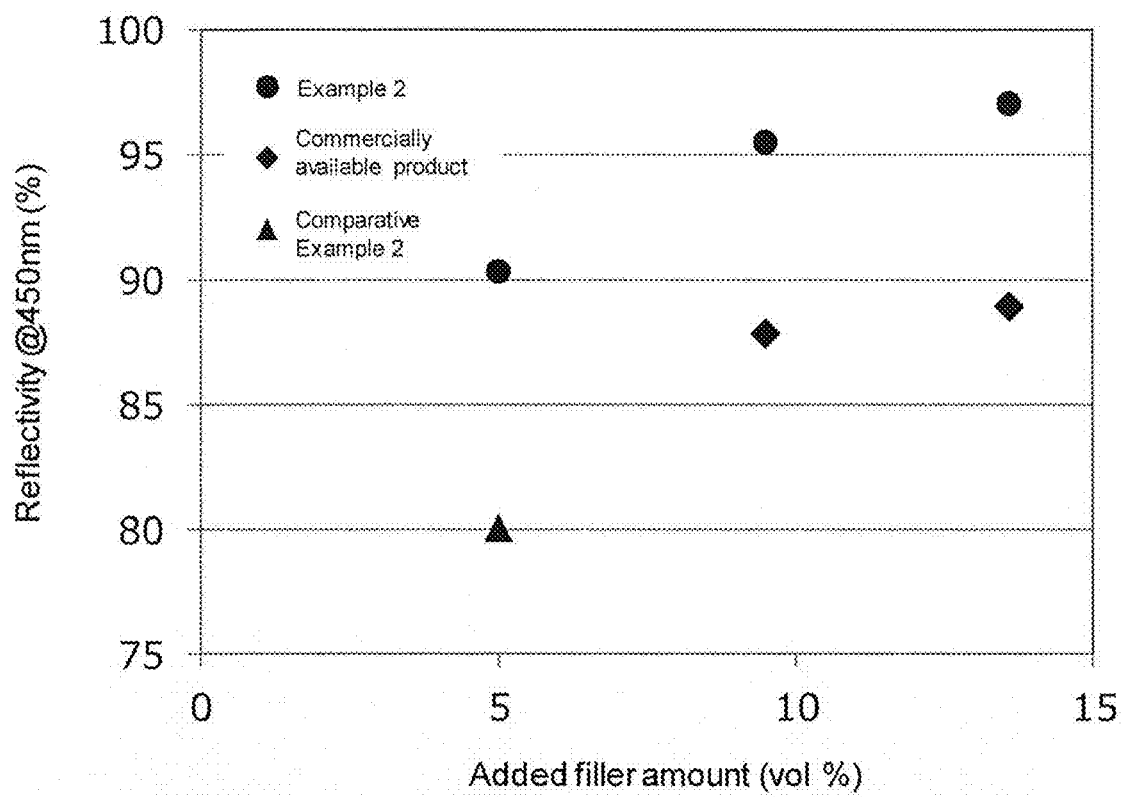
FIG. 4 is a diagram showing the reflectivity of the hexagonal boron nitride fibers of Example 2, the hexagonal boron nitride fibers of Comparative Example 2, and the hexagonal boron nitride fibers of a commercially available product.

FIG. 4 is the measurement result of filler-added amount dependency of reflectance at 450 nm. The boron nitride fibers of Example 2 were higher in reflectivity than both of the commercially available boron nitride and the fibrous boron nitrides of Comparative Example 1.

Figure 5A:
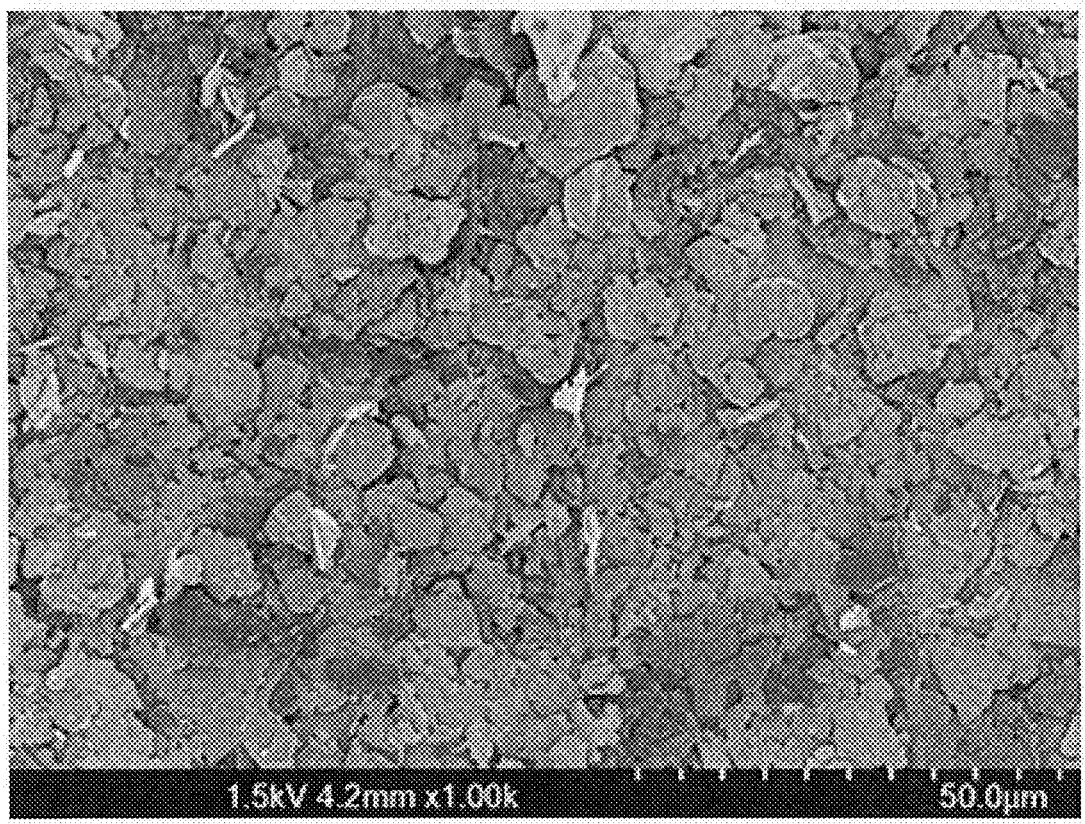
FIG. 5A is an SEM image of a commercially available hexagonal boron nitride product.
Figure 5B:
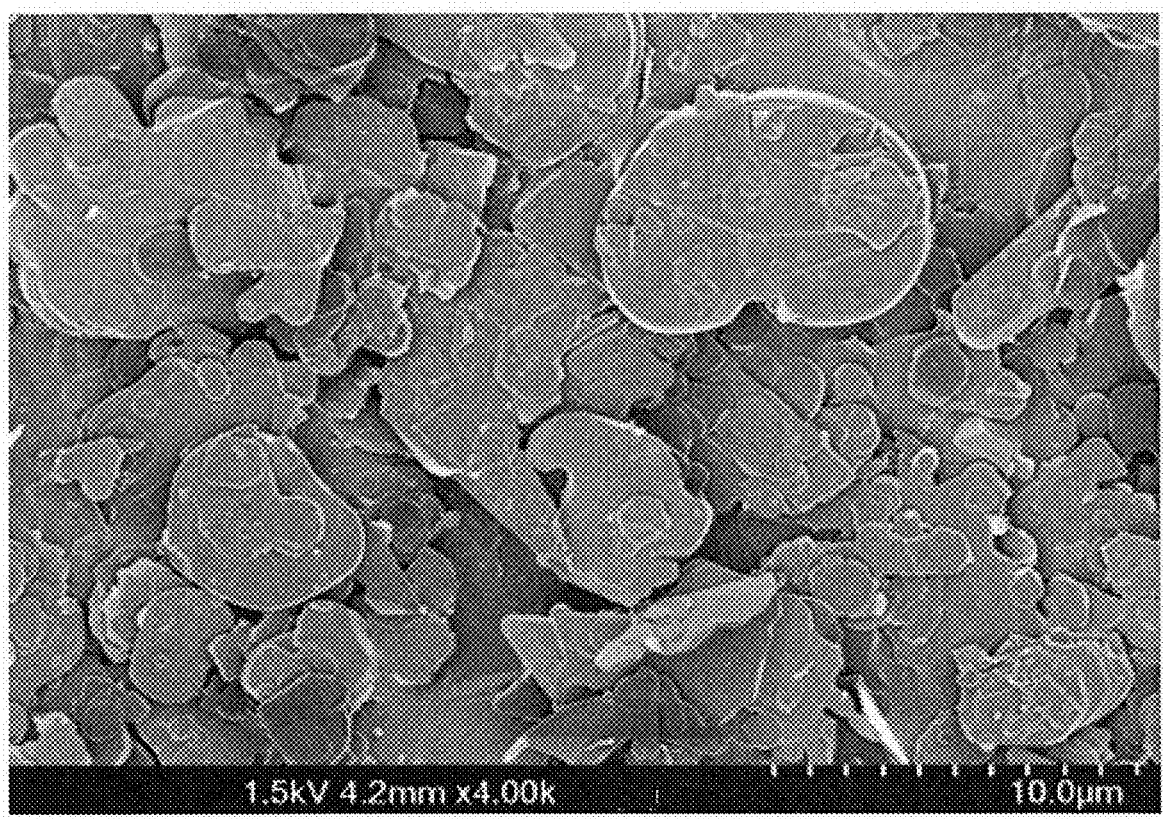
FIG. 5B is an enlarged SEM image of FIG. 5A.

For reference, FIG. 5A and FIG. 5B are SEM images of a magnification of 1,000 times and 4,000 times, respectively, of commercially available boron nitride (available from Denka Company Limited, model HGP). As shown in FIG. 5A and FIG. 5B, the commercially available boron nitride were not fibrous.

Thermal Conductivity

Figure 6:
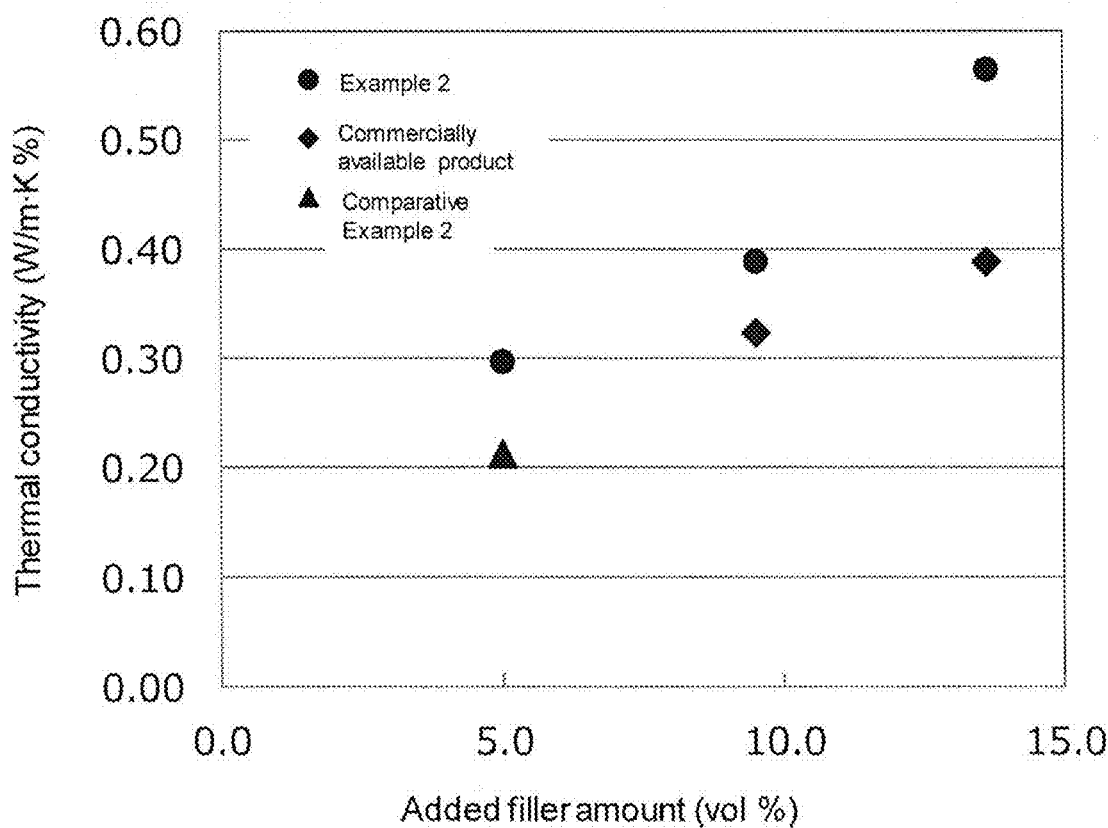
FIG. 6 is a graph showing the thermal conductivity of the hexagonal boron nitride fibers of Example 2, the hexagonal boron nitride fibers of Comparative Example 2, and the hexagonal boron nitride fibers of a commercially available product.

The hexagonal boron nitride fiber of Example 2, the amorphous fibrous boron nitride (Comparative Example 1), and commercially available hexagonal boron nitride having a particle size of 5.0 μm (available from Denka Company Limited, model HGP) were subjected to measurement of thermal conductivity. The measurement of thermal conductivity was performed on a mixture obtained by mixing a predetermined amount of boron nitride as filler with thermosetting epoxy resin and curing the same by heat treatment at 120° C. The thermal conductivity was calculated as the product of thermal diffusivity, specific heat capacity, and density. The thermal diffusivity was measured by the flash method using LEA447 available from NETZSCH GmbH & Co. The density is the measured value. The specific heat capacity was calculated by weighting the specific heat capacity of hexagonal boron nitride and the specific heat capacity of epoxy resin by their added weight. The result is shown in FIG. 6 and Table 3.

TABLE 3

|  | Added filler amount (vol %) | Thermal conductivity (%) |
|---|---|---|
| Example 2 | 5.0 | 0.30 |
|  | 9.5 | 0.39 |
|  | 13.6 | 0.56 |
| Comparative Example 1 | 5.0 | 0.21 |
| Commercially available product | 9.5 | 0.32 |
|  | 13.6 | 0.39 |

The thermal conductivity of boron nitride fiber of Example 2 had a thermal conductivity higher than that of the fibrous boron nitride of Comparative Example 1 and that of commercially available hexagonal boron nitride of a particle size of 5 μm (available from Denka Company Limited, model HGP).

It is to be understood that, although certain embodiments of the present invention have been described, various other embodiments and variants may occur to those skilled in the art that are within the scope and spirit of the invention, and such other embodiments and variants are intended to be covered by the following claims.

What is claimed is:

1. Hexagonal boron nitride fibers comprising hexagonal boron nitride, wherein an X-ray diffraction spectrum of the hexagonal boron nitride fibers includes a diffraction peak having a half-width of 2.0° or less in a region where 2θ is in a range of 20° to 30°:
   wherein hexagonal boron nitride fibers comprise an aggregate of particles containing hexagonal boron nitride, and
   wherein plate-like particles containing hexagonal boron nitride are aligned irregularly in a direction, forming a fibrous shape with the fiber length in the direction.

2. The hexagonal boron nitride fibers according to claim 1, wherein the half-width of the diffraction peak is less than 1.0°.

3. The hexagonal boron nitride fibers according to claim 2, wherein, in the diffraction peak, a ratio of a peak width at an intensity of 20% of a maximum peak intensity to a peak width at an intensity of 80% of the maximum peak intensity is 3.5 or less.

4. The hexagonal boron nitride fibers according to claim 1, wherein, in the diffraction peak, a ratio of a peak width at an intensity of 20% of a maximum peak intensity to a peak width at an intensity of 80% of the maximum peak intensity is 3.5 or less.

5. The hexagonal boron nitride fibers according to claim 1, wherein an average aspect ratio of the hexagonal boron nitride fibers is 1.5 or more and 150 or less.

6. The hexagonal boron nitride fibers according to claim 1, wherein an average fiber length of the hexagonal boron nitride fibers is 1 μm or greater and 100 μm or less.

7. The hexagonal boron nitride fibers according to claim 1, wherein an average aspect ratio of the plate-like particles is greater than 1.0 and 200 or less.

8. The hexagonal boron nitride fibers according to claim 1, wherein an average major diameter of the plate-like particles is 0.1 μm or greater and 10 μm or less.

9. The hexagonal boron nitride fibers according to claim 1, wherein an average thickness of the plate-like particles is 0.05 μm or greater and 5 μm or less.

* * * * *